United States Patent
Aldridge et al.

(10) Patent No.: US 6,941,754 B2
(45) Date of Patent: Sep. 13, 2005

(54) HEATING APPLIANCE

(75) Inventors: Wayne Kenneth Aldridge, Nottingham (GB); David Anthony Clark, Hugglescote (GB); James Robert Lowrie, Derby (GB); Stephen Michael Hasko, Huntingdon (GB); Heather Allderidge, Derby (GB)

(73) Assignee: Microgen Energy Limited (GB)

( * ) Notice: Subject to any disclaimer, the term of this patent is extended or adjusted under 35 U.S.C. 154(b) by 0 days.

(21) Appl. No.: 10/491,521

(22) PCT Filed: Dec. 18, 2002

(86) PCT No.: PCT/GB02/05775

§ 371 (c)(1),
(2), (4) Date: Apr. 2, 2004

(87) PCT Pub. No.: WO03/052328

PCT Pub. Date: Jun. 26, 2003

(65) Prior Publication Data

US 2004/0250538 A1 Dec. 16, 2004

(30) Foreign Application Priority Data

Dec. 19, 2001 (GB) ............................................. 0130380

(51) Int. Cl.$^7$ ............................................... F01B 29/10
(52) U.S. Cl. ........................................... 60/524; 60/517
(58) Field of Search ........................... 60/517, 520, 524, 60/526

(56) References Cited

U.S. PATENT DOCUMENTS

| | | | |
|---|---|---|---|
| 2,995,185 A | | 8/1961 | Bowen et al. |
| 3,062,000 A | * | 11/1962 | Percival ........................ 60/792 |
| 5,664,945 A | * | 9/1997 | Maynard et al. ............. 431/302 |
| 5,873,250 A | * | 2/1999 | Lewis et al. ................... 60/650 |
| 6,220,030 B1 | | 4/2001 | Clucas et al. |

FOREIGN PATENT DOCUMENTS

| | | | |
|---|---|---|---|
| DE | 199 36 591 C1 | | 2/2001 |
| DE | 100 06 006 A1 | | 8/2001 |
| GB | 2268578 | | 1/1994 |
| JP | 63-99414 | * | 4/1988 |
| JP | 4-103910 | * | 6/1992 |
| JP | 06241567 | | 8/1994 |

* cited by examiner

Primary Examiner—Hoang Nguyen
(74) Attorney, Agent, or Firm—Needle & Rosenberg, P.C.

(57) ABSTRACT

The heating appliance, and particularly a dchp system, comprising two burners (3, 17). A splitter valve (23) splits a stream of air (24) into two streams, one for each burner. Combustible fuel is mixed with the air. A controller controls the combustible fuel, and the splitter valve position, thereby controlling the portion of air fed to each burner.

7 Claims, 4 Drawing Sheets

HEATING APPLIANCE

CROSS REFERENCE TO RELATED APPLICATIONS

The present application claims priority to Great Britain Application No. 0130380.9, filed Dec. 19, 2001, which application is incorporated herein fully by this reference.

The present invention relates to a heating appliance. In particular, the invention relates to a domestic combined heat and power (DCHP) unit.

Such DCHP units have been proposed which incorporate a Stirling engine connected to an alternator to generate electricity. The heat produced by the engine which would otherwise be wasted is used to heat water feeding the domestic water and central heating systems, and therefore becomes a valuable product of the DCHP system. It has been shown that the most favourable economics are achieved for the unit when the Stirling engine/alternator is sized to generate approximately 1 kW of electricity. At this level, however, only approximately 5 kW of heat will be provided, which is substantially below a typical domestic heat load of in excess of 20 kW.

In order to supply the remaining heat, so that the DCHP unit can compete effectively with the current specification of domestic boiler, a supplementary gas burner is required. It is desirable for both burners to discharge into a common flue, so that they can both heat the domestic water supply, and so that only a single flue connection to the outside world is required. However, under these circumstances, the use of a separate fan for each burner can cause problems if one of the fans is not running. Under these circumstances, hot gas can be forced back through the unlit burner and its associated gas train thereby damaging the components and filling the unit with combustion products. One way of avoiding this is disclosed in our earlier copending Application GB 0124985.3 in which the reverse flow of hot gases through a burner is detected, and remedial action is taken by starting the fan of the unlit burner. The present invention provides an alternative solution which avoids the efficiency losses involved with the parasitic power consumption of an additional fan and also the adverse cooling effects that are caused by passing additional cold air through the heating system.

According to a first aspect of the present invention a heating appliance comprises first and second burners, a supply of air, a splitter valve for splitting the supply of air into a stream feeding the first burner and a stream feeding the second burner, means for feeding combustible fuel to mix with the air and a controller for controlling the combustible fuel flow and the proportion of the air fed to each burner depending on the appliance requirements.

As this arrangement uses a single fan and a splitter valve to split the air flow between the two burners, there is never any prospect of hot combustion gasses from one burner flowing back through the other burner. Further, there is a cost saving associated with running the two burners from a single fan.

The invention only requires a single fan and therefore provides a saving in overall cost, and requires less space than a dual fan arrangement.

The invention has applications beyond a DCHP system, and can be used for any appliance having two pre-mixed burners requiring modulating control of the heat input to two separate heating circuits. This will generally be a wet heating appliance, such as a water-based domestic boiler feeding a domestic central heating and/or a hot water system, but could equally apply to a heating system based on other working fluids (for example air or oil). Alternatively, the appliance could be a catering appliance, such as a pizza/burger grill where upper and lower burners fire simultaneously into the same cooking space.

One possibility is to provide a mixing chamber in which the fuel and air are mixed upstream of the splitter valve, so that the splitter valve splits the mixed fuel and air stream. Such an arrangement has the advantage that it only requires a single supply of fuel. However, in this case, the splitter valve has to be a primary safety device requiring extensive design and certification. It also needs to be able to close completely and provide a perfect seal in the gas supply chain. Therefore, preferably, means for feeding combustible fuel is positioned to feed the fuel to the split air streams downstream of the splitter valve. The arrangement also allows full control of the air/fuel mixture to each burner as it allows the air/fuel ratio to be set separately for each burner. Under these circumstances, the valve only needs to be designed to handle the air flow, and is able to tolerate a degree of leakage without allowing unwanted fuel into an unlit burner. In practice, a hole is provided in a vane of the splitter valve to allow a bleed flow in addition to any flow of air past the vane. This ensures that an inactive burner is adequately ventilated and there is no build up of combustible gases at any point within the burner. In addition, this air flow prevents the accumulation of condensation on the burner surfaces as it cools.

The invention is particularly applicable to a DCHP system in which the Stirling engine requires a burner, and a second burner is arranged to heat a water heater to generate the necessary heat to provide the typical domestic heat load. By modulating the output from these burners, a full range of heat requirements can be satisfied, and the flexibility of the system can be greatly enhanced.

The splitter valve may be any type of valve suitable for controllably splitting two gaseous flows. In its simplest form, the splitter valve is a flap valve.

Alternatively, the first aspect of the invention may be defined as a method of controlling a fuel/air mixture to first and second burners, the method comprising splitting a single air supply into a first stream feeding the first burner and a second stream feeding the second burner, feeding combustible fuel to mix with the air and controlling the proportion of the mixed flow fed to each burner depending on the appliance requirements.

This control is preferably carried out by controlling the speed of the fan and the position of the splitter valve. This represents a simple way of controlling the flow requiring minimal components. Further, the fuel requirements of the two burners may be satisfied independently.

An example of the invention will now be described with reference to the accompanying drawings, in which.

Figure 1:
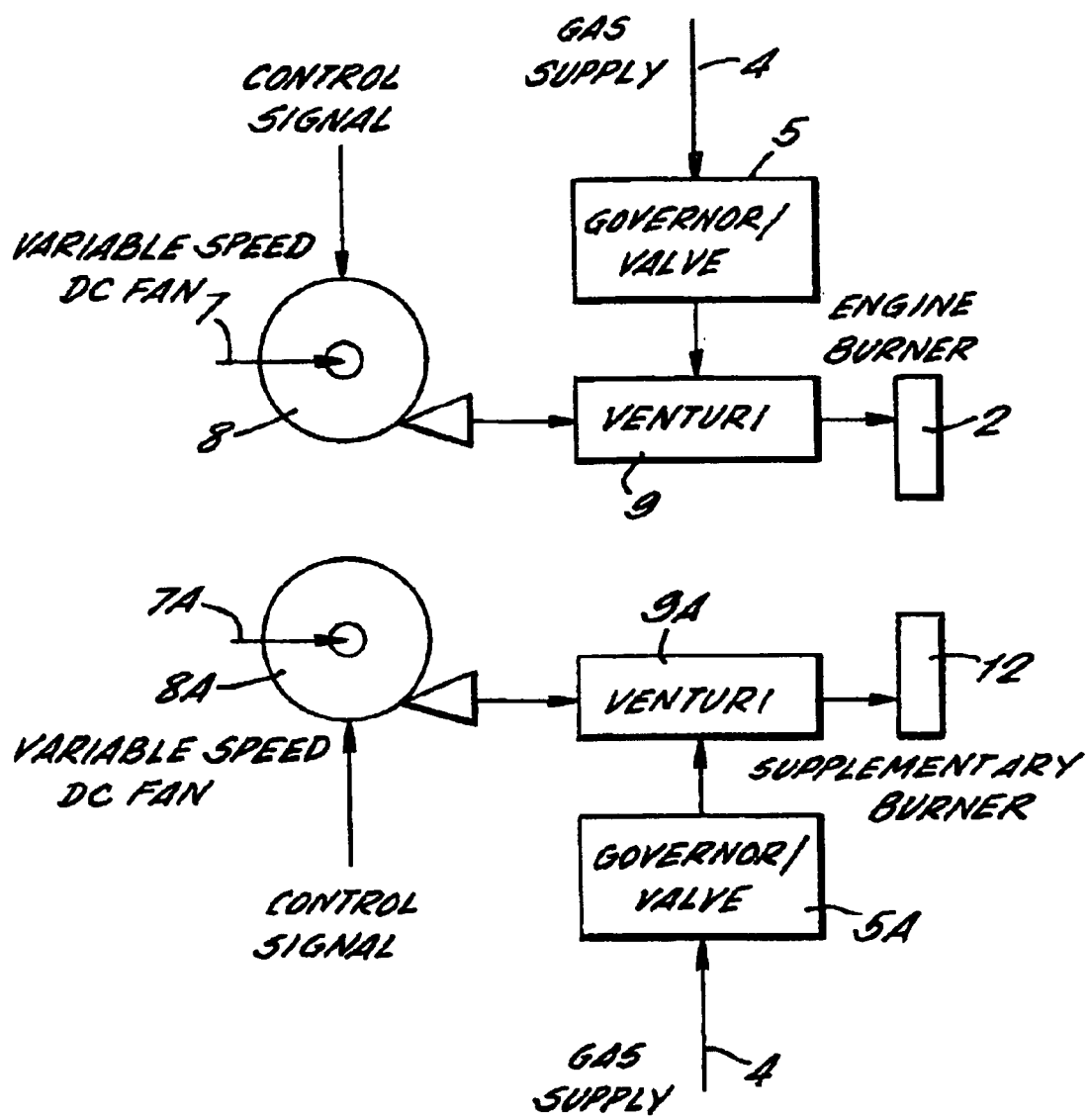
FIG. 1 is a schematic showing a gas train layout which does not form a part of the present invention.

The arrangement shown in FIG. 1 comprises a burner 2 to supply heat to the head of a Stirling engine. Gas for the burner is supplied from gas supply line 4 which is fed to a multi-functional controller 5 (Honeywell 1000 series direct burner ignition controller). The multi-function gas control regulates the pressure of the gas that is fed to the mixing system to that of the inlet air stream (ambient), using a standard pressure governor and a zero gas governor. It also incorporates a dual solenoid safety shut-off valve, manual flow control valve, and control circuitry. This regulated gas supply is fed to a mixer, consisting of a variable speed DC fan 8, drawing air stream 7 into a venturi 9. The rate at which the gas is entrained into the air stream is dependent on the flow rate of the gas into the venturi. By adjusting the gas flow from the valve, the correct gas:air ratio can be achieved. Varying the speed of the DC fan can then be used to increase the mixture flow rate. The gas:air ratio will be maintained at the preset level over an operating range of mixture flow rates, allowing the fan speed alone to be used to modulate the operation of the burner(s). A separate burner controller is provided to control the actuation of the burner. This controller provides control of the ignition of the burner, and also detects the presence of a flame at the burner allowing the flow of gas to be shut-off if the flame should be extinguished.

The supply of fuel and air to the supplementary burner 12 is identical to that described in relation to the Stirling engine 1. This arrangement comprises a gas supply line 4 common to the burner 2 (shown separately in FIG. 1 for clarity) a multi-functional controller 5A, a burner controller, air supply 7A, fan 8A and venturi 9A.

In use, the supply of gas and air to the Stirling engine burner 2 and the supplementary burner 12 are controlled independently according to the domestic demand for heat. If the domestic requirement is for more heat than can be provided by the Stirling engine burner 2, the supplementary burner 12 is activated to supply this additional requirement.

A first arrangement according to the present invention will now be described with reference to FIG. 2.

The Stirling engine 1 is heated by a first heater 14 in a manner similar to that described above. The heat is transferred to the head by a system of fins 3 as disclosed in our earlier co-pending application no. 0020012.

Figure 2:
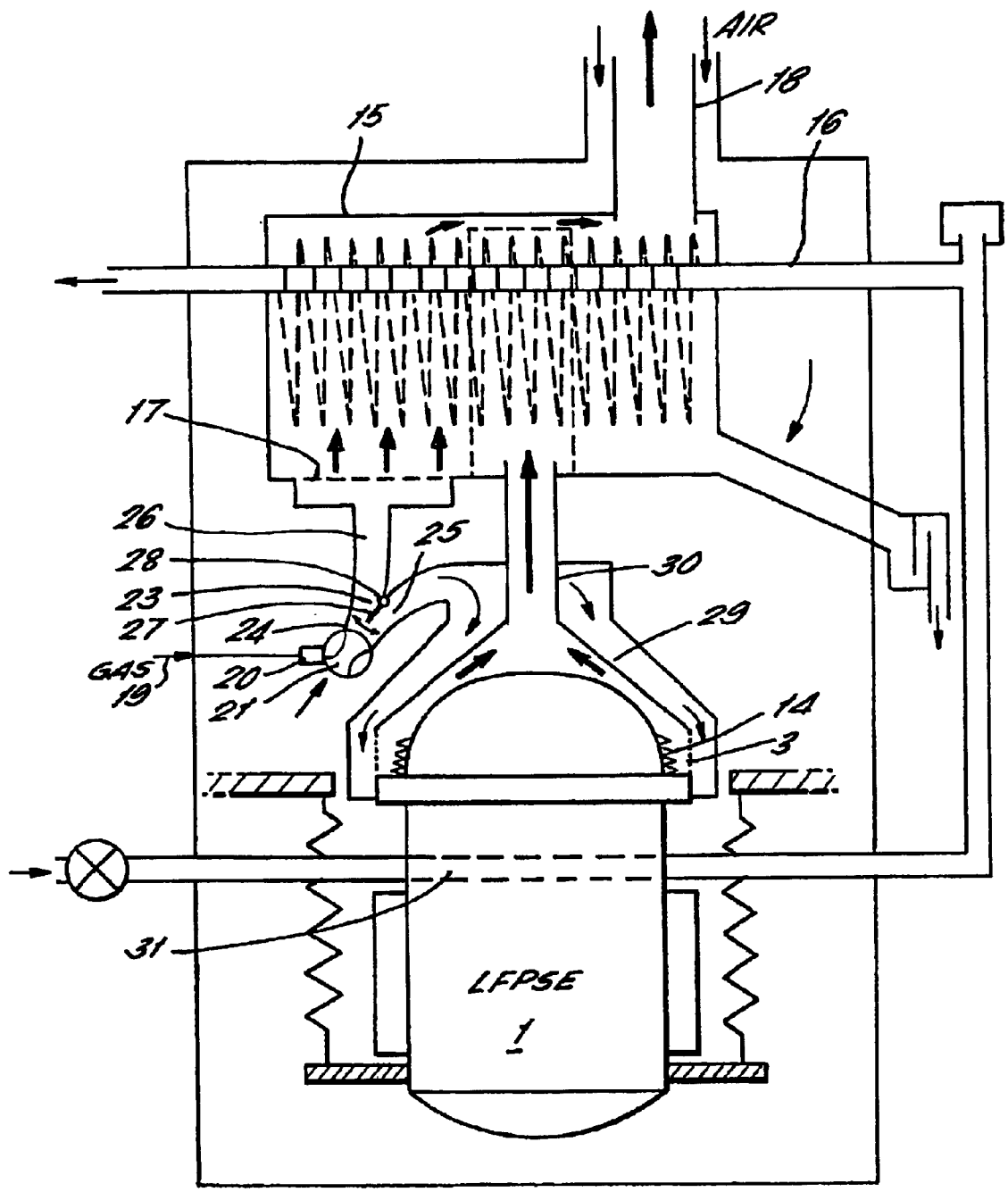
FIG. 2 is a schematic diagram showing a first example of the present invention.

The arrangement in FIG. 2 has a water heater 15 which is arranged to heat a water stream 16 by virtue of second burner 17 (similar to the supplementary burner 12 of FIG. 1). Exhaust gases are expelled through flue 18.

A common gas supply line 19 is provided for both the first 14 and second 17 burners. This gas flow is controlled by a single multi-functional valve 20 which functions in a similar way to the multi-functional valve 5 referred to with respect to FIG. 1. The burner controls controlling ignition and flame detection of the burner may be incorporated into a multi-functional controller. Gas leaving the multi-functional valve 20 enters a mixing chamber in the form of a venturi manifold 21 and is mixed with an air stream driven by fan (not shown). The arrangement of fuel and air supply described thus far is similar to that shown with reference to FIG. 1.

The gas and air mixture is now supplied to a splitter valve 23 in which one inlet 24 leads to a first burner outlet 25 and a second burner outlet 26. The splitter valve 23 has a single valve element, the position of which determines the ratio of the stream in the inlet 24 which is fed to the two outlets 25, 26. The relative amount of flow to each outlet is controlled by a flap valve 27 which is rotatable about an axis 28. The position of the flap valve 27 will be set by the multi-functional controller, and is driven to that position, for example, by a servo motor.

Water from the domestic heating circuit flows through the Stirling engine cooler 31, removing heat to maintain the required internal Stirling engine temperature differential.

The fuel/air mixture fed to the Stirling engine 1 flows around a cowling 29 enclosing the burner arrangement and is hence heated by the hot gas stream leaving the burner. The exhaust gas which has given up some of its heat to the incoming mixture leaves the cowling through manifold 30 and enters the water heater 15 where it comes into contact with the water stream 16 which has already picked up some heat from the Stirling engine cooler 31 so as to preheat the water stream 16 upstream of the second burner 17. The second burner 17 is fired to provide supplementary heating to the water stream 16 if required. The exhaust gas from the first burner 14 then mixes with the exhaust gas from the second burner 17, and the combined gases flow across a further stage of condensing heat exchanger pipework in a separate chamber within the water heater 15. The combined gas stream then leaves the water heater 15 through flue 18. This removes the need for a separate flue for the first burner as required by FIG. 1.

Figure 3:
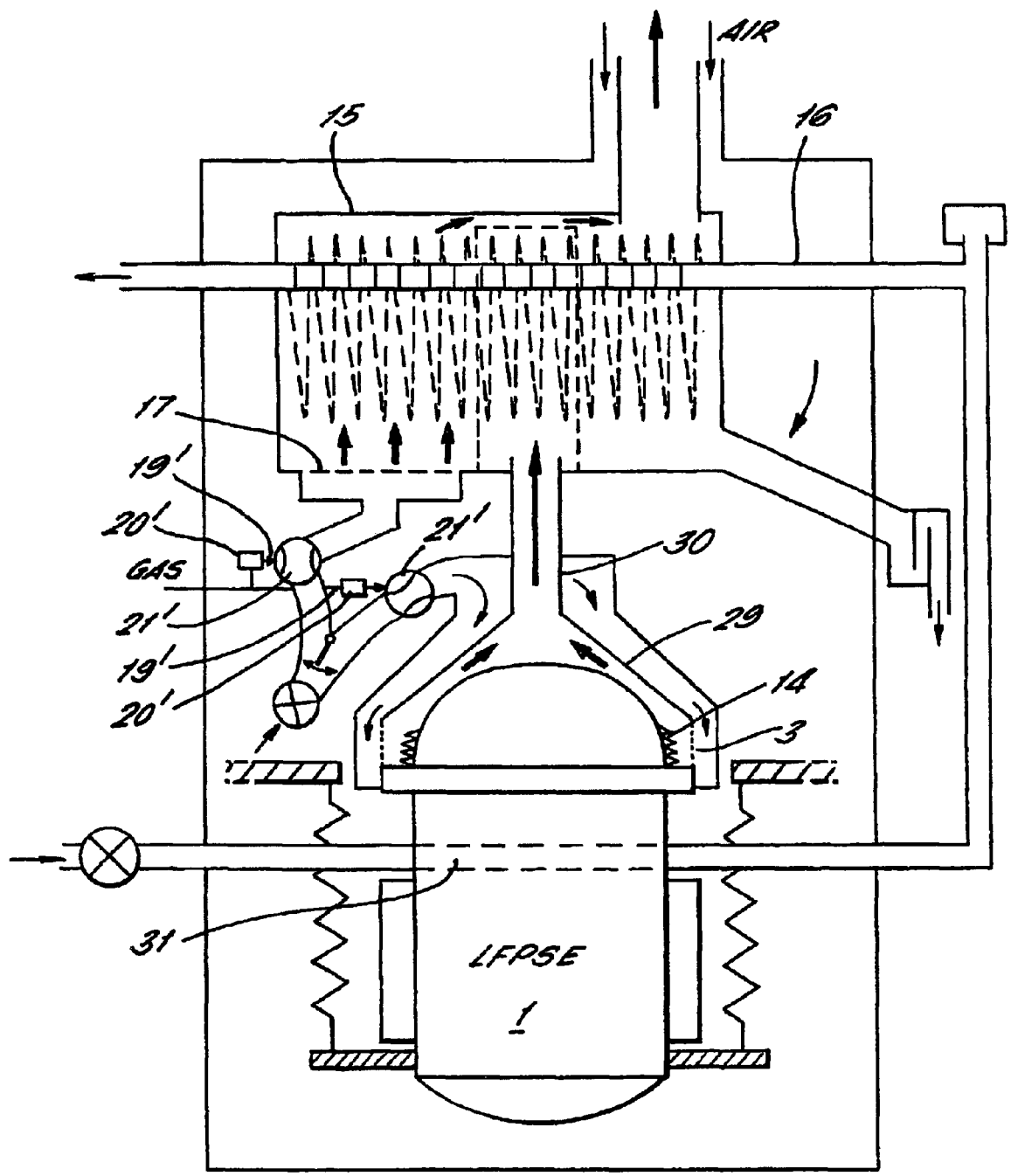
FIG. 3 is a schematic diagram similar to FIG. 2 showing a second example of the present invention.
Figure 4:
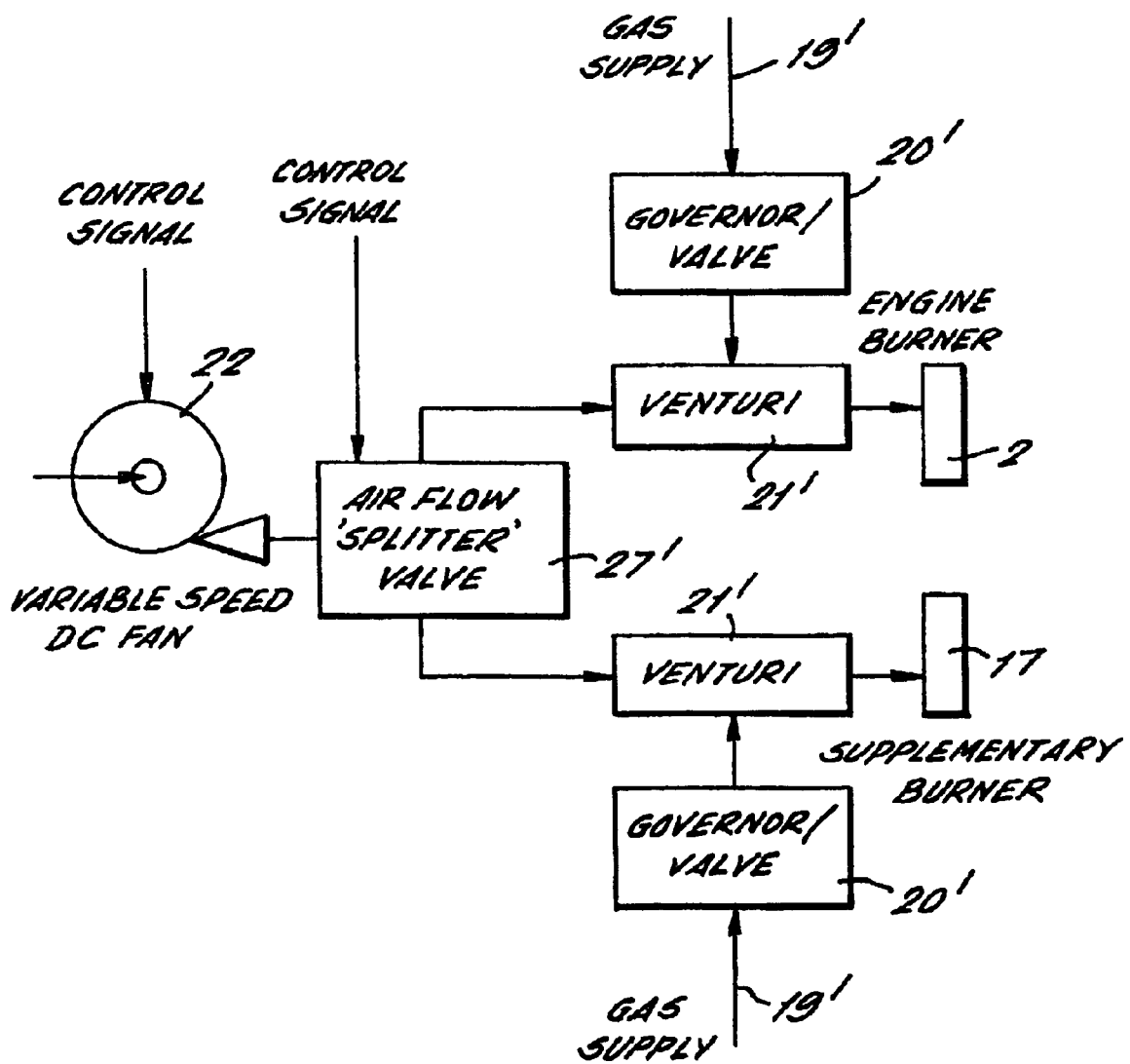
FIG. 4 is a schematic similar to FIG. 1 showing the gas train of the FIG. 3 example.

A second arrangement in accordance with the present invention is shown in FIGS. 3 and 4.

In this arrangement, most components are the same as those shown in FIG. 2 and the same components have been indicated with the same reference numerals.

The main difference between FIG. 2 and FIGS. 3 and 4 is that, in FIGS. 3 and 4, the air flow from the variable speed DC fan 22 is split by an air flow splitter valve 27 before the gas is added. Therefore, two gas supply lines 19 are required, each being controlled by its own governor/valve 20, whereupon each gas supply is mixed with one of the air flow streams in Venturis 21 speed of the fan 22, the position of the splitter valve 27' and the governors/valves 20' are controlled by the multi-function controller.

What is claimed is:

1. A domestic combined heat and power system comprising a Stirling engine which is heated by a first burner and a water heater which is heated by a second burner; the system further comprising a supply of air, a splitter valve for splitting the supply of air into a stream feeding the first burner and a stream feeding the second burner, means for feeding combustible fuel to mix with the air and a controller for controlling the combustible fuel flow and the proportion of the air fed to each burner depending on the appliance requirements; wherein the splitter valve is a single valve positioned upstream of the two burners: and wherein the controller further comprises means to control the speed of the fan and the position of the splitter valve to control the proportion of the mixed flow fed to each burner.

2. A system according to claim 1, wherein the means for feeding combustible fuel is positioned to feed the fuel to the split air streams downstream of the splitter valve.

3. A system according to claim 1, wherein the means for feeding combustible fuel is positioned to feed fuel to the air stream upstream of the splitter valve.

4. A system according to claim 1, wherein the splitter valve is a flap valve.

5. A system according to claim 1, further comprising an exhaust gas duct passing from the Stirling engine in contact with a combustible gas inlet into the burner to preheat the combustible gas entering the burner and subsequently contacting water upstream of the water heater to preheat this water.

6. A method of controlling a fuel/air mixture to first and second burners, the method comprising splitting a single air supply into first stream feeding the first burner and a second stream feeding the second burner, feeding combustible fuel to mix with the air and controlling the proportion of the mixed flow fed to each burner depending on the burner requirements; wherein the air supply is driven by a fan, and is split by a splitter valve upstream of the two burners, the method further comprising controlling the speed of the fan and the position of the splitter valve to control the proportion of the mixed flow fed to each burner.

7. A method as claimed in claim 5, wherein the combustible fuel is fed to the first and second air streams downstream of the split into the two streams.

* * * * *